R. B. MORTON.
DRIVE CHAIN.
APPLICATION FILED MAY 1, 1912.
1,189,162.
Patented June 27, 1916.
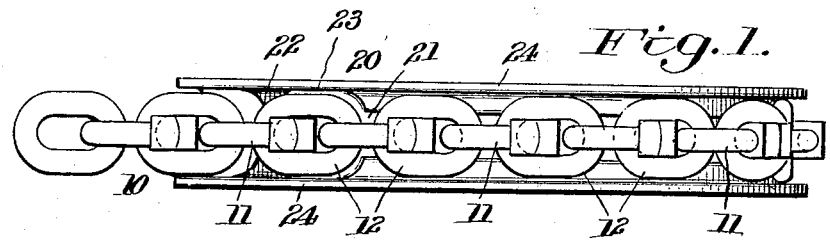
Fig. 1.
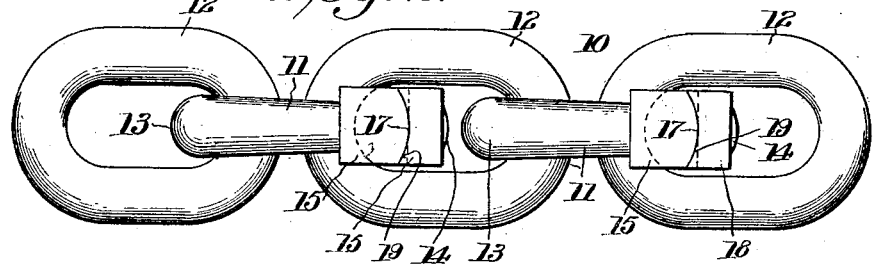
Fig. 2.
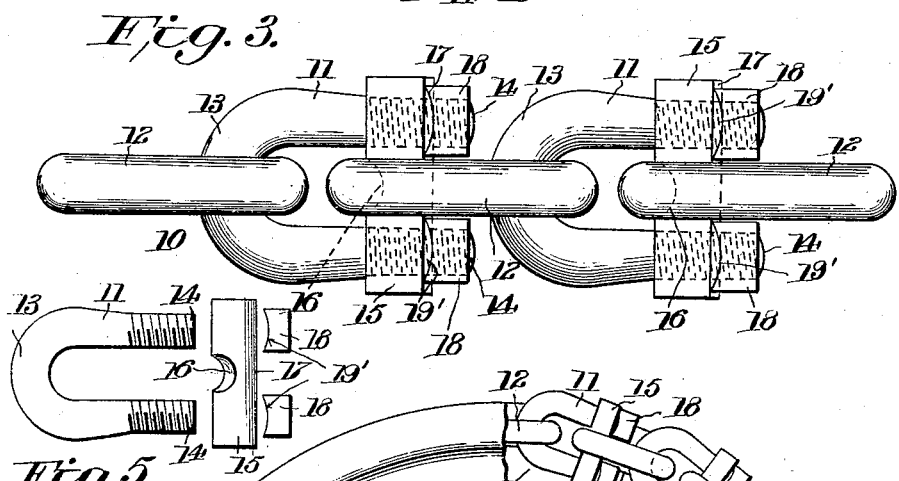
Fig. 3.
Fig. 5.
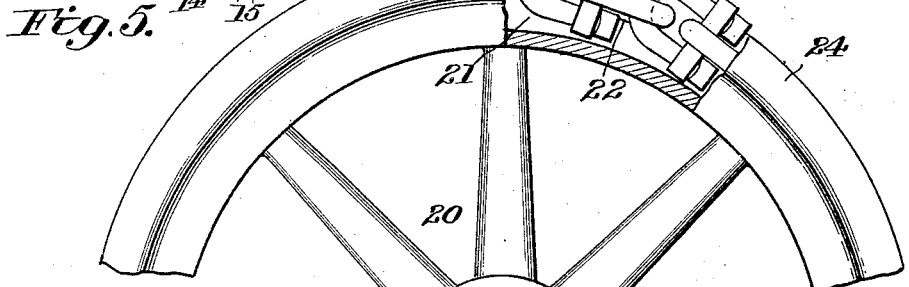
Fig. 4.
WITNESSES
INVENTOR
Rudolph B. Morton
By Hodges & Hodges
Attorneys

UNITED STATES PATENT OFFICE.

RUDOLPH B. MORTON, OF CLEVELAND, OHIO.

DRIVE-CHAIN.

1,189,162.  Specification of Letters Patent.  Patented June 27, 1916.

Application filed May 1, 1912. Serial No. 694,382.

*To all whom it may concern:*

Be it known that I, RUDOLPH B. MORTON, a citizen of the United States, residing at Cleveland, in the county of Cuyahoga and State of Ohio, have invented new and useful Improvements in Drive-Chains, of which the following is a specification.

This invention relates to certain new and useful improvements in drive chains.

It is well known that in the use of chains as a flexible driving means, serious difficulty is experienced because the links elongate in consequence of the strain and wear, or either, this elongation being so great that in a short time it is usually necessary to readjust the operating parts in order to keep the chain at the proper pitch. This readjustment is usually accomplished by means of adjustable bearings for the driving or driven sprocket, whereby the two sprockets may be adjusted relatively to each other to maintain sufficient tautness in the chain to secure efficient results. It is also common, where the stretch of the chain is excessive, to shorten the chain by removing one or more links thereof. Such adjustments, however, fail to alter the variations in pitch of the links relative to the sheave or sprocket, which variations must be compensated for in order to secure accurate meshing of the chain and efficient results in operation.

The object of the present invention is to provide a drive chain which will be capable of use universally in transmitting power in either direction between sheaves or sprockets, and provided with adjustable links to compensate for elongation and variations in pitch incident to its use, and to provide a uniform and exact pitch relative to the sprocket or sheave at all times, as nearly as may be.

The invention will be particularly fully set forth and particularly pointed out in the claims.

In the accompanying drawing: Figure 1 is an edge view of a sheave or sprocket wheel with my improved chain operating in conjunction therewith. Fig. 2 is an enlarged view illustrating the adjustable links in plan. Fig. 3 is a similar view illustrating the adjustable links in side elevation. Fig. 4 is a view in side elevation illustrating the chain passing around a sheave. Fig. 5 is a detail view of one of the adjustable links, with the parts separated.

Referring to the drawing, 10 designates a drive chain made up of adjustable links 11 and alternate nonadjustable links 12. The links 12 may be of any suitable or preferred type, those shown being of the ordinary coil chain links, or drop forged links. The adjustable links 11 each comprise a U-shaped member 13 having its ends 14 threaded and passed through suitable openings in a cross piece 15, the inner face of said cross piece being provided with a recess 16 corresponding to the curvature of the inner end of one of the links 12. The outer face of said cross piece is convexed transversely, as indicated at 17. The cross piece 15 is held in position by means of nuts 18 working on the threaded portions of the ends 14 of the U-shaped member, the inner face of each nut being concaved at 19 to fit over the transversely convexed portion of the cross bar 15. By this means the nuts are prevented from turning off when the chain is in use, and the complemental convexed and concaved portions 17 and 19 also serve as an index or guide in adjusting the cross piece 15 in compensating for elongation of the chain.

The sheave or sprocket 20 is preferably formed with a central annular groove 21 to accommodate the adjustable links 11, and annular shoulders 22 on each side of said groove, said shoulders being provided with pockets 23 to accommodate the non-adjustable links 12. Lateral displacement of the chain is prevented by means of annular flanges 24.

In practice, the nonadjustable links 12 engage the end walls of the pockets 23, and when power is applied to the chain, the sprocket is rotated by reason of the pulling action of said nonadjustable links against the end walls of said pockets. The links 12 extend down into the groove 21. When the chain becomes worn or "stretched" the slack is taken up by turning the nuts 18 of each link 12 one half turn, and in this manner the chain may be accurately adjusted to take up any slack. This is of particular advantage where the chain is used in heavy work, or for transmitting power under heavy loads, such as for driving traction engines, motor trucks of all descriptions, dredges, and the like. In this connection it will be noted that my improved chain is flexible and capable of use in connection with work of any character where a chain may be employed. It will be further observed that the adjustment of the chain may be accomplished even though the chain may be under tension. If desired the nuts 18 may be concaved at 19', at right angles to the concaved portions 19, as illustrated in Fig. 3, so that adjustment may be obtained by a quarter turn of each nut.

Having thus explained the nature of my invention and described an operative manner of constructing and using the same, although without attempting to set forth all of the forms in which it may be made, or all of the forms of its use, what I claim is:—

1. In a drive chain the combination with a plurality of non-adjustable links, of a plurality of adjustable links each comprising a member formed of a single piece of metal bent into U-shape, a cross piece across the open end of said U-shaped member, and nuts working on the extremities of said U-shaped member to secure the said cross piece in position, said cross piece and said U-shaped member being loosely engaged by adjacent non-adjustable links to permit universal relative movement.

2. In a drive chain, an adjustable link comprising a single piece of metal bent into U-shape, a rigid cross piece closing the space between the extremities of the open end of said U-shaped piece, said cross piece being provided with a longitudinally disposed convexed outer face, and nuts working on the extremities of said U-shaped piece and engaging the convexed side of said cross piece.

3. In a drive chain, an adjustable link comprising a single U-shaped piece of metal, a rigid cross piece closing the space between the arms of said U-shaped piece, said cross piece being provided with a longitudinally disposed convexed outer face, and nuts working on the arms of said U-shaped piece, one face of each nut being concaved to conform to the curvature of and to interlock with the convexed face of said cross piece.

4. In a drive chain an adjustable link comprising a single U-shaped piece of metal, a cross piece across the space between the ends of said U-shaped piece, said cross piece having its inner face provided with a curved recess corresponding with the curvature of the closed end of said U-shaped piece, and means for adjusting said cross piece.

5. In a drive chain a plurality of adjustable links each comprising a single piece of metal bent into U-shape and having its extremities screw threaded, adjusting lock nuts mounted on said threaded extremities, and a cross piece concaved on its inner side to conform to the curvature of the closed end of said U-shaped link.

6. A drive chain comprising a plurality of adjustable links each comprising a single piece of metal bent into U-shape and having its extremities screw threaded, adjusting nuts mounted on said threaded extremities and a rigid cross piece concaved on its inner side to conform to the curvature of the closed end of the U-shaped link, said cross piece being also provided with means for locking said nuts, said locking means permitting adjustment of the chain under tension, and non-adjustable links alternating with the adjustable links and loosely connected thereto to permit universal relative movement.

In testimony whereof I have hereunto set my hand in presence of two subscribing witnesses.

RUDOLPH B. MORTON.

Witnesses:
  WM. S. HODGES,
  CHAS. E. RIORDAN.

Copies of this patent may be obtained for five cents each, by addressing the "Commissioner of Patents, Washington, D. C."